Figure 1:
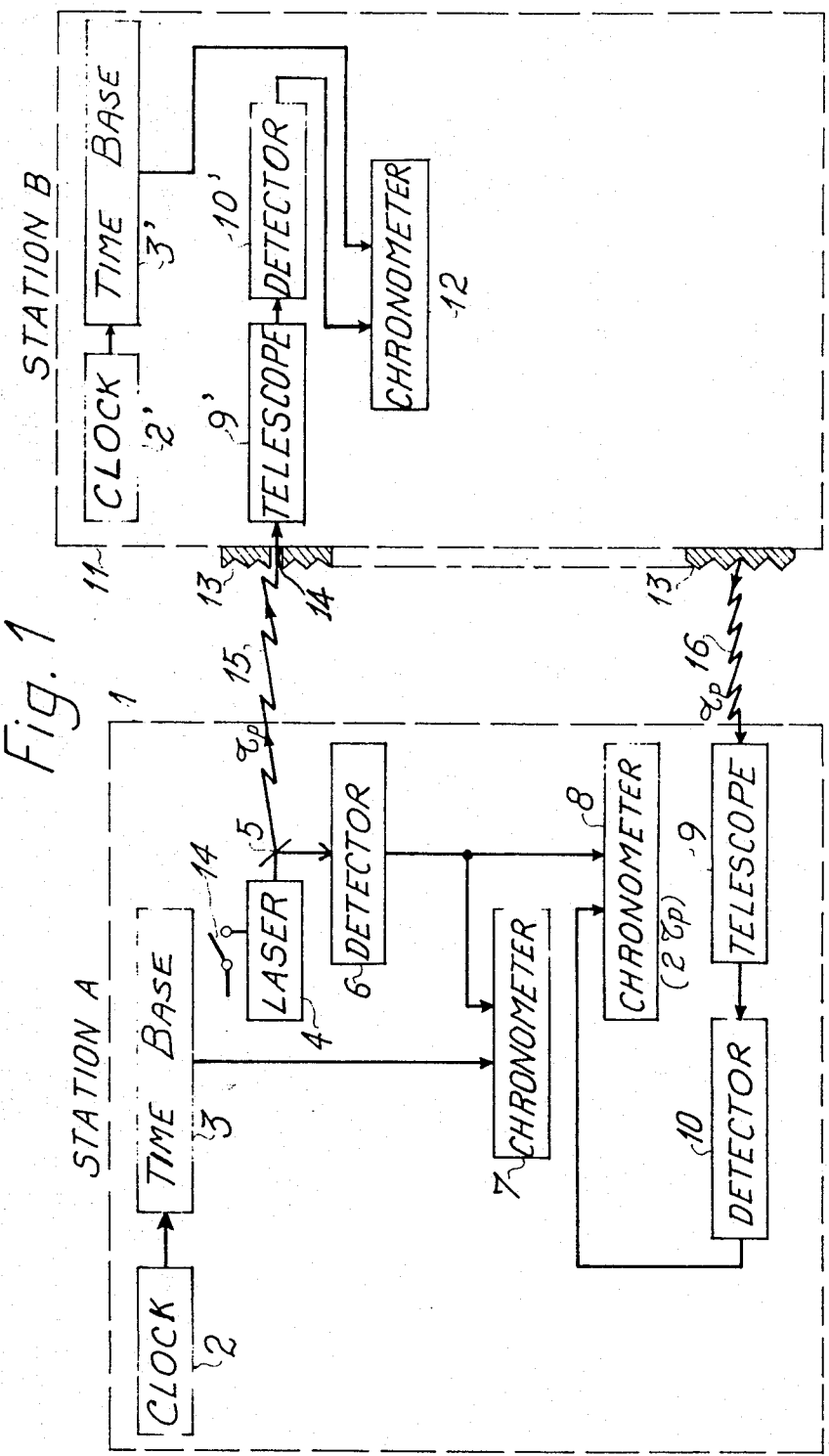

United States Patent [19]

Besson et al.

[11] 3,722,258
[45] Mar. 27, 1973

[54] SYSTEM FOR MEASURING TIME DIFFERENCE BETWEEN AND SYNCHRONIZING PRECISION CLOCKS

[75] Inventors: Jean R. Besson, Issy-les-Moulineaux; Jean R. Boillot, L'Hay-les-Roses, both of France

[73] Assignee: Office National D'Etudes Et De Recherches Aerospatiales, Chatillon-Sous-Bagneux, France

[22] Filed: Mar. 9, 1972

[21] Appl. No.: 233,078

[30] Foreign Application Priority Data

Mar. 12, 1971 France..................................7108710

[52] U.S. Cl..............................................73/6, 58/24
[51] Int. Cl...............................................G04b 17/00
[58] Field of Search............73/6; 58/24, 35; 250/199

[56] References Cited

UNITED STATES PATENTS

| 2,931,217 | 4/1960 | Wendt | 73/6 |
| 3,128,465 | 4/1964 | Brilliant | 58/35 |
| 3,243,592 | 3/1966 | Tomiyasu et al. | 250/199 |
| 3,530,663 | 9/1970 | Marti | 58/35 |
| 3,541,552 | 11/1970 | Carlson | 58/24 |

Primary Examiner—S. Clement Swisher
Attorney—Abraham A. Saffitz

[57] ABSTRACT

System for measuring the time difference between a master precision clock and a slave precision clock situated respectively in a master and a slave station remote from each other. The clocks generate timing pulses with respective frequencies very close to each other. The master station includes a laser source of light pulses generating luminous pulse signals, a local detector of these signals and means for transmitting them towards the slave station. The slave station includes a detector of the luminous pulse signals and means for reflecting the same towards said master station. Two chronometers in the master station measure the time difference between the instant of generation of a luminous pulse signal and a master clock timing pulse and the time difference between the instant of generation of a luminous pulse signal and the instant of detection of a reflected back luminous pulse signal and a third chronometer in the slave station measures the time difference between the instant of detection of a luminous pulse signal and a slave clock timing pulse.

2 Claims, 2 Drawing Figures

SYSTEM FOR MEASURING TIME DIFFERENCE BETWEEN AND SYNCHRONIZING PRECISION CLOCKS

The invention relates to a method of and to a system for determining the time difference between stationary or mobile precision clocks in remote locations.

It is already known to control the difference in rate between a standard or master clock and secondary or slave clocks by a time pulse radio-transmission system. The master clock can be carried in an airplane conveying a first, transmitter receiver station, a second transmitter receiver station being provided at the location of the slave clock. The reference time base or time scale is transmitted by the aircraft radio station in the form of signal pulses and is compared with the secondary time base or reference scale, the result of this comparison being transmitted back to the monitoring aircraft. This method allows a degree of accuracy within 50 nanoseconds to be obtained, with a very bulky and expensive equipment.

The present invention avoids these disadvantages and greatly improves the accuracy of the control system. The radio pulses are replaced by luminous signals the emitting source being a laser emitting pulses of very short duration, the leading front whereof is defined within the order of 1 nanosecond. The linked receiver is a light detector of the photomultiplier type or a photodiode. Finally, the active emitter in the secondary station is replaced by a passive emitter consisting of a light-reflecting element. This form of embodiment simplifies the apparatus required and allows these stations to be provided with compact and inexpensive equipment.

Figure 2:
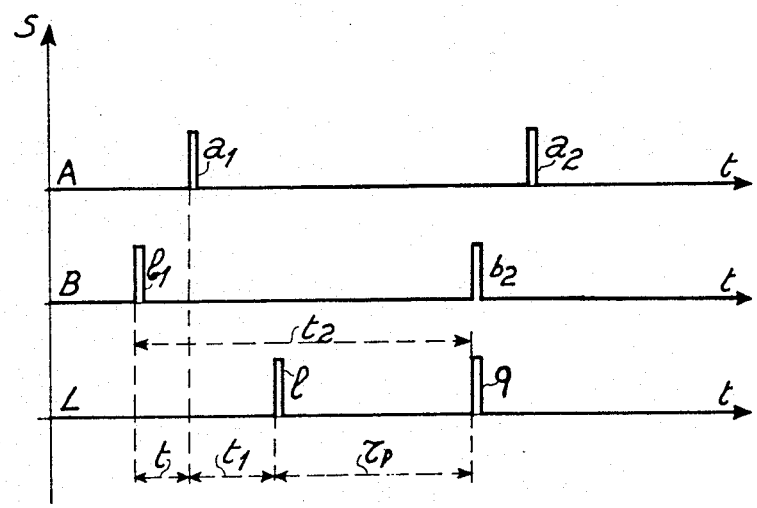

The invention will be better comprehended by reference to the following, detailed description and the accompanying drawings, wherein:

FIG. 1 represents one form of embodiment of a system for determining the time difference between widely separated precision clocks; and FIG. 2 shows a time sequence of the pulses involved in the system for a better comprehension thereof.

In FIG. 1 the two stations where are located the clocks the rates whereof are to be compared, are presented by the rectangles 1 and 11; station A being for instance the master or reference station, and station B being the secondary or slave station. In the example shown, station B is stationary, and station A is fitted in an aircraft.

Station A is equipped with an atomic reference clock 2, e.g. a cesium clock, a time base 3 which is in fact a pulse frequency divider circuit synchronized with the said clock and for instance emitting pulses with a frequency of 10 per second, a laser 4, a semitransparent mirror 5, a first light detector 6, a first chronometer 7, a second chronometer 8, a telescope 9, and a second light detector 10.

Station B comprises a secondary atomic clock 2', a time base 3', a telescope 9', a detector 10', and a third chronometer 12. It further incorporates a light-wave reflector corresponding with the emission frequency of the laser. The reflector can be made, as known, of a plurality of adjacent reflecting pyramids having a vertex angle of 90°. It comprises a hole 14.

The laser 4 may be of the ruby type, furnishing very short pulses, the leading front whereof is fixed with an accuracy of the order of one nanosecond.

The assembly constituted by the clock 2 and the time scale 3 is well known in the art. This time base works on the principle of the frequency divider. The detectors in the stations A and B are preferably rapid photomultipliers responding to the laser radiation. The chronometers 7, 8 and 12 are similarly well-known instruments of the counter type allowing time intervals to be measured equal to the differences in the timing of the instants of occurrence of the pulse signals applied to their start and stop terminals. Such a chronometer starts at the instant when the first signal is received, and stops at the instant of arrival of the second signal. These have at present an accuracy within $10^{-1}$ nanoseconds. The telescopes are light-amplifiers of known kind.

The system functions as follows:

The laser is triggered at any desired instant by means of the switch 14, either manually by an operator, or automatically. It will be clear that no synchronization is necessary between the laser emission and the emission from the time base 3. The pulse emitted by the laser is transmitted partly to the detector 6 through the semitransparent mirror 5 in station A, and partly to the detector 10' in station B through the intermediary of the telescope 9', obviously with a certain delay $\tau_p$ due to the proparagtion of the laser light signal between the stations A and B. The luminous pulse received at station B is returned to the detector 10 of the station A by the reflector 13 and through the telescope 9, which introduces a new delay factor $\tau_p$. The chronometer 7 receives the signals coming from the time base 3 and the detector 6, and measures the time interval $t_1$ representing the difference between the times of arrival of the said signals at the chronometer. The chronometer 12 receives the signals originated from the time base 3' and the detector 10' and measures the time interval $t_2$ equal to the difference between the instants of arrival of the said signals at that chronometer. Lastly, the chronometer 8 receives the signals from the detectors 6 and 10 and measures the time interval corresponding to the difference between the times of arrival of these signals at this chronometer. This time interval, is equal to $2\tau_p$ since the chronometer 8 receives the signal from the laser directly through the local detector 6 and after a to-and fro passage of the light between the stations A and B, from the detector 10.

The indications supplied by these three chronometers enable calculation of the difference in rate between the two clocks i.e. the time-shift $t$ between the two time bases 3 and 3'. For proof of this reference is made to FIG. 2. In this figure the different signal pulses have been plotted against time: the signals $a_1, a_2, \ldots$ emitted by the time base 3 of station A, the signals $b_1, b_2, \ldots$ emitted by the time base 3' of the station B, and a signal l emitted by the laser 4. Let it be assumed for example that the time scale of the station B was in advance with reference to station A, by the time interval $t$ to be measured. The chronometer 12 receives the laser signal with a delay $\tau_p$, represented as $q$, and directly the signal coming from the time base of B, shown as $b_1$, and the figure now shows the relation ship:

$$t_2 = t + t_1 + \tau_p$$

This relationship allows t to be calculated since the chronometers 7, 8 and 12 will furnish respectively the times $t_1$, $2\tau_p$, and $t_2$, with a possible accuracy of the order of $10^{-1}$ nanoseconds. The overall precision of the measurements of $t$ is of the order of one nanosecond.

To obtain a measurement series it is obviously necessary each time to zeroize the chronometer 7 in station A, and means must be provided to inhibit the action of the laser during this zeroizing operation, should the laser be automatically energized at regular intervals.

This system can be operated by electronic means for instance by transmitting the results $t_1$ and $\tau_p$ to the fixed station B which thus possesses all the data for calculating $t$. This of course allows of setting the time by the clock 2' at this station in such manner that the system above-described can be used to synchronize a series of secondary or slave clocks, on a master airborne clock.

Conversely, the station B may be installed in a satellite and include an electronic emitter furnishing the result $t_2$. Such a station could synchronize a number of fixed stations such as A with a high degree of precision, these fixed stations incorporating further a suitable electronic receiver.

What we claim is:

1. A system for measuring the time difference between a master precision clock and a slave precision clock situated respectively in a master and a slave station remote from each other, said clocks generating timing pulses with respective frequencies very close to each other, said system comprising a laser source of light pulses located in the master station and generating luminous pulse signals, means in said master station for locally detecting said luminous pulse signals, means in said master station for transmitting said luminous pulse signals towards said slave station, means in said slave station for detecting said luminous pulse signals, means in said slave station for reflecting said luminous pulse signals towards said master station, a first and a second chronometer in the master station for respectively measuring the time difference between the instant of generation of a luminous pulse signal and a master clock timing pulse and the time difference between the instant of generation of a luminous pulse signal and the instant of detection of a reflected back luminous pulse signal and a third chronometer in the slave station for measuring the time difference between the instant of detection of a luminous pulse signal and a slave clock timing pulse.

2. A system as set forth in claim 1 in which the means in the slave station for reflecting the luminous pulse signals towards the master station is formed by an array of reflecting pyramids adjacent to one another and having a vertex angle of 90° and the means in the slave station for detecting the luminous pulse signals comprise a hole in said array, a light telescope behind said hole and a photomultiplier cooperating with said telescope.

* * * * *